US007221276B2

(12) United States Patent
Olsen, III et al.

(10) Patent No.: US 7,221,276 B2
(45) Date of Patent: May 22, 2007

(54) SYSTEMS AND METHODS FOR USING RADIO FREQUENCY IDENTIFICATION TAGS TO COMMUNICATING SORTING INFORMATION

(75) Inventors: John A. Olsen, III, Cumming, GA (US); Gerald R. Colglazier, Douglasville, GA (US); David L. Bradley, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 203 days.

(21) Appl. No.: 10/910,167

(22) Filed: Aug. 2, 2004

(65) Prior Publication Data

US 2006/0022824 A1 Feb. 2, 2006

(51) Int. Cl.
*G08B 13/14* (2006.01)
*G06F 7/00* (2006.01)

(52) U.S. Cl. .................. 340/572.1; 700/215; 700/224; 700/226

(58) Field of Classification Search ............ 340/568.5, 340/572.1, 572.2, 815.45; 700/223–226
See application file for complete search history.

(56) References Cited

U.S. PATENT DOCUMENTS

| | | | | |
|---|---|---|---|---|
| 4,832,204 | A | 5/1989 | Handy et al. | |
| 5,472,097 | A | 12/1995 | Villachica | |
| 5,778,377 | A | 7/1998 | Marlin et al. | |
| 5,794,789 | A | 8/1998 | Payson et al. | |
| 5,869,819 | A | 2/1999 | Knowles et al. | |
| 5,877,962 | A | 3/1999 | Radcliffe | |
| 5,971,587 | A | 10/1999 | Kato et al. | |
| 6,130,613 | A * | 10/2000 | Eberhardt et al. | 340/572.7 |
| 6,246,925 | B1 | 6/2001 | Robinson et al. | |

(Continued)

FOREIGN PATENT DOCUMENTS

EP 0 928 641 A 7/1999

(Continued)

OTHER PUBLICATIONS

International Search Report from PCT; International Application No. PCT/US2005/024097; dated Oct. 6, 2005.

(Continued)

*Primary Examiner*—Daniel Wu
*Assistant Examiner*—Jennifer Mehmood
(74) *Attorney, Agent, or Firm*—Alston & Bird LLP

(57) ABSTRACT

The present invention provides novel systems and methods for identifying a location. Generally described radio frequency identification tags equipped with LED's are used to provide a visual indication of a location.

18 Claims, 8 Drawing Sheets

U.S. PATENT DOCUMENTS

| | | | | |
|---|---|---|---|---|
| 6,335,685 | B1 | 1/2002 | Schrott et al. | |
| 6,370,446 | B1 | 4/2002 | Divine | |
| 6,600,418 | B2 * | 7/2003 | Francis et al. | 340/572.1 |
| 6,701,304 | B2 * | 3/2004 | Leon | 705/401 |
| 6,741,178 | B1 * | 5/2004 | Tuttle | 340/572.1 |
| 6,786,404 | B1 | 9/2004 | Bonner et al. | |
| 6,801,833 | B2 * | 10/2004 | Pintsov et al. | 700/223 |
| 6,817,517 | B2 * | 11/2004 | Gunther | 235/375 |
| 7,170,413 | B1 * | 1/2007 | Waterhouse et al. | 340/572.1 |
| 2002/0067267 | A1 * | 6/2002 | Kirkham | 340/572.7 |
| 2003/0233165 | A1 * | 12/2003 | Hein et al. | 700/216 |
| 2004/0004119 | A1 | 1/2004 | Baldassari et al. | |
| 2004/0016684 | A1 | 1/2004 | Braginsky et al. | |
| 2004/0036595 | A1 * | 2/2004 | Kenny et al. | 340/505 |
| 2005/0119786 | A1 * | 6/2005 | Kadaba | 700/224 |
| 2005/0149226 | A1 * | 7/2005 | Stevens et al. | 700/214 |
| 2005/0179547 | A1 * | 8/2005 | Maloney et al. | 340/568.1 |
| 2005/0258961 | A1 * | 11/2005 | Kimball et al. | 340/572.1 |

FOREIGN PATENT DOCUMENTS

| | | | |
|---|---|---|---|
| WO | WO 02/083507 | A | 10/2002 |

OTHER PUBLICATIONS

ACCENTURE. Radio Frequency Identification White Paper [online]Nov. 16, 2001[retrieved on Nov. 30, 2002]. Retrieved from the Internet: <URL:http://www.accenture.com/xdoc/en/services/technology/vision/RFIDWhitePaperNov01.pdf>.

UPS Pressroom, UPS Suite of New Technology Promises Better Customer Service, Operating Efficiency, Sep. 23, 2003. Retrieved from the Internet: <URL:http://www.pressroom.ups.com/pressreleases/archives/archive/0.1363.4337.00.html>.

UPS Pressroom, UPS Unveils State-of-the-Art Package Hub in Maple Grove, Minnesota, Nov. 12, 2002. Retrieved from the Internet: <URL:http://www.pressroom.ups.com/pressreleases/archives/archive/0.1363.4216.00.html.

* cited by examiner

SYSTEMS AND METHODS FOR USING RADIO FREQUENCY IDENTIFICATION TAGS TO COMMUNICATING SORTING INFORMATION

FIELD OF THE INVENTION

The present invention is directed generally to sorting packages within a delivery network. More specifically, the present invention provides systems and methods for using radio frequency identification tags to communicate sorting information to sorting operators.

BACKGROUND OF THE INVENTION

The delivery of a package from a consignor to a consignee typically requires sorting the package at several locations before the package reaches the final destination. A conventional delivery network typically includes a series of customer service centers that receive and deliver packages, and several intermediate hubs that provide links between the service centers. The flow of a package through this delivery network typically begins at a service center. From there, the package flows through a series of intermediate hubs before reaching the destination facility responsible for delivering the package to the destination address. Within each intermediate hub, the package is sorted according to the destination address for the package and consolidated for transport to the next intermediate hub or service center in the delivery process.

The tremendous volume of packages flowing through the intermediate hubs creates a logistical challenge. To date, sorting at the intermediate hubs is a highly manual process that relies heavily on the knowledge-base of the sorting operator. The sorting operator reads the destination address zip code and service level from a shipping label on a package and sorts the package to the appropriate conveyor belt, bin, or chute. The sorting location for each zip code is specified in a series of standard sorting charts. Sorting charts are well known in the industry and specify the next sorting facility the package will pass according to a delivery plan. These sorting charts are typically indexed according to destination zip code and the service level of the package, wherein the service level of a package represents the committed delivery time for the package. The efficiency of the sorting operation depends on how quickly the sorting operator determines the appropriate sorting location for a package. To improve the efficiency, sorting operators memorize the zip codes associated with each sorting location and use the sorting charts sparingly. This highly manual process often results in sorting errors.

Typically, a sortation facility is directly linked to only a few sortation hubs in the network as shown in FIG. 1. However, packages may be sorted based on facilities further downstream in the delivery process. For example, assume the delivery plan for a package specifies that the package will pass through Hubs A, B and C in sequence. The sorting process at Hub A may include consolidating packages bound for Hub C into a container even though Hub A is not directly connected to Hub C. When this container arrives at Hub B, the operator only has to sort the single large container rather than several smaller packages because the packages were presorted at Hub A. This process reduces the overall handling of the packages. But, this consolidation practice is limited by the ability of sort operators to remember which packages are sorted to which location. A need therefore exists for processes to identify the sort locations that do no rely on the memory of the sorting operators. Because traditional sort processes rely so heavily on the knowledge-base of the sort operators, there is a natural hesitancy to change a sort plan that results in a change to the knowledge-base. The learning curve necessary to implement a change creates significant inefficiencies and increases the opportunity for sorting mistakes. Accordingly, any change to a sort plan must be weighed against the confusion caused by the change. As a result, many timesaving adjustments to sorting charts are discarded.

Therefore an unsatisfied need exists for improved systems and methods for sorting packages within a delivery network that overcome the deficiencies in the prior art, some of which are discussed above.

BRIEF SUMMARY OF THE INVENTION

The present invention seeks to provide more efficient systems and methods for sorting packages within a delivery network without relying on the knowledge base of the sorting operator. In furtherance of this goal, the invention seeks to use radio frequency identification to communicate sorting instructions to a sorting operator.

The present invention accomplishes these goals by providing novel systems and methods for identifying the appropriate sorting location using radio frequency identification tags.

In one aspect of the present invention, a system is provided for sorting an item. This system includes a plurality of RFID tags equipped with lights that illuminate in response to a communication; a plurality of sorting locations, wherein each of the sorting locations is associated with one of the plurality of RFID tags; a data capture device configured to capture sorting indicia from the item; a sort assist tool that receives the sorting indicia from the data capture device and associates a sorting instruction; and an interrogator that receives the sorting instruction and communicates with one of the plurality of RFID tags based at least in part on the sorting instruction such that the light on the one of the plurality of RFID tags illuminates.

In another aspect of the present invention, a method for sorting a package is provided that includes the steps of: capturing shipping indicia from the package; identifying a sorting location based at least in part on the captured indicia; communicating with an RFID tag associated with the identified sort location; and illuminating a light associated with the RFID tag in response to the communication.

In a further aspect of the present invention, a system for sorting an item to one of a plurality of target locations is provided, wherein RFID tags equipped with a LED are associated with each of the plurality of target locations. The system includes a data capture device that captures indicia from the item, the indicia identifying the one of a plurality of target locations associated with the item, a sort assist tool that receives the indicia and identifies the RFID tag that is associated with the target location associated with the item, and an interrogator that communicates with the RFID tag and turns on the LED.

In a further aspect of the present invention, a system for identifying the location of an item is provided. This system includes a plurality of storage locations associated with a plurality of RFID tags, wherein the tags are equipped with an LED, a location tool configured to identify one of the plurality of storage locations for the item, and an interrogator that receives the storage location identity and communicates with an RFID tag associated with the storage location and illuminates the associated tag's LED.

BRIEF DESCRIPTION OF THE SEVERAL VIEWS OF THE DRAWINGS

Figure 1:
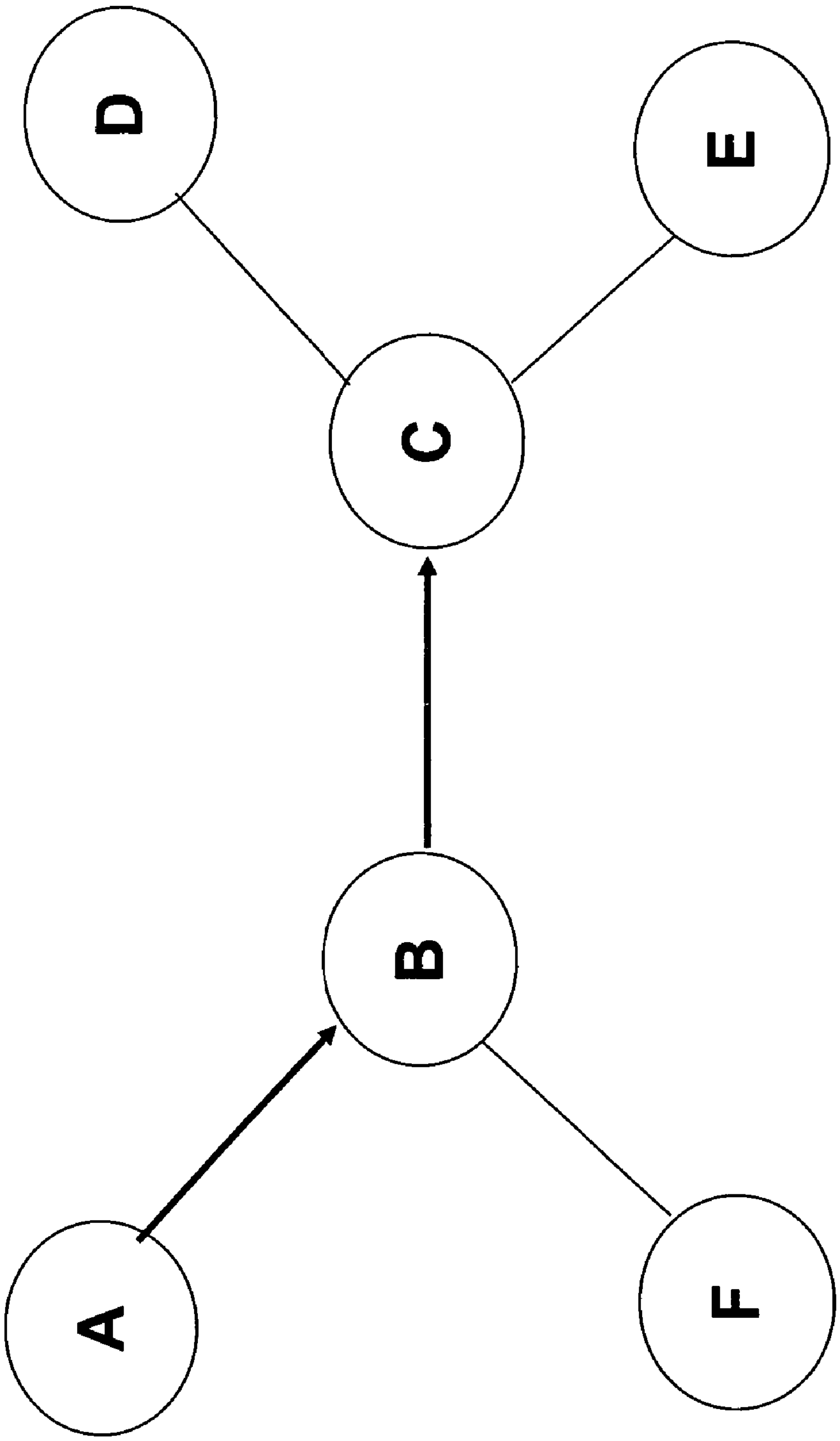
FIG. 1 (Prior Art)

Having thus described the invention in general terms, reference will now be made to the accompanying drawings, which are not necessarily drawn to scale, and wherein:

FIG. 1 is a schematic drawing of an exemplary delivery network illustrating several intermediate sortation hubs connected by transportation.

Figure 2:
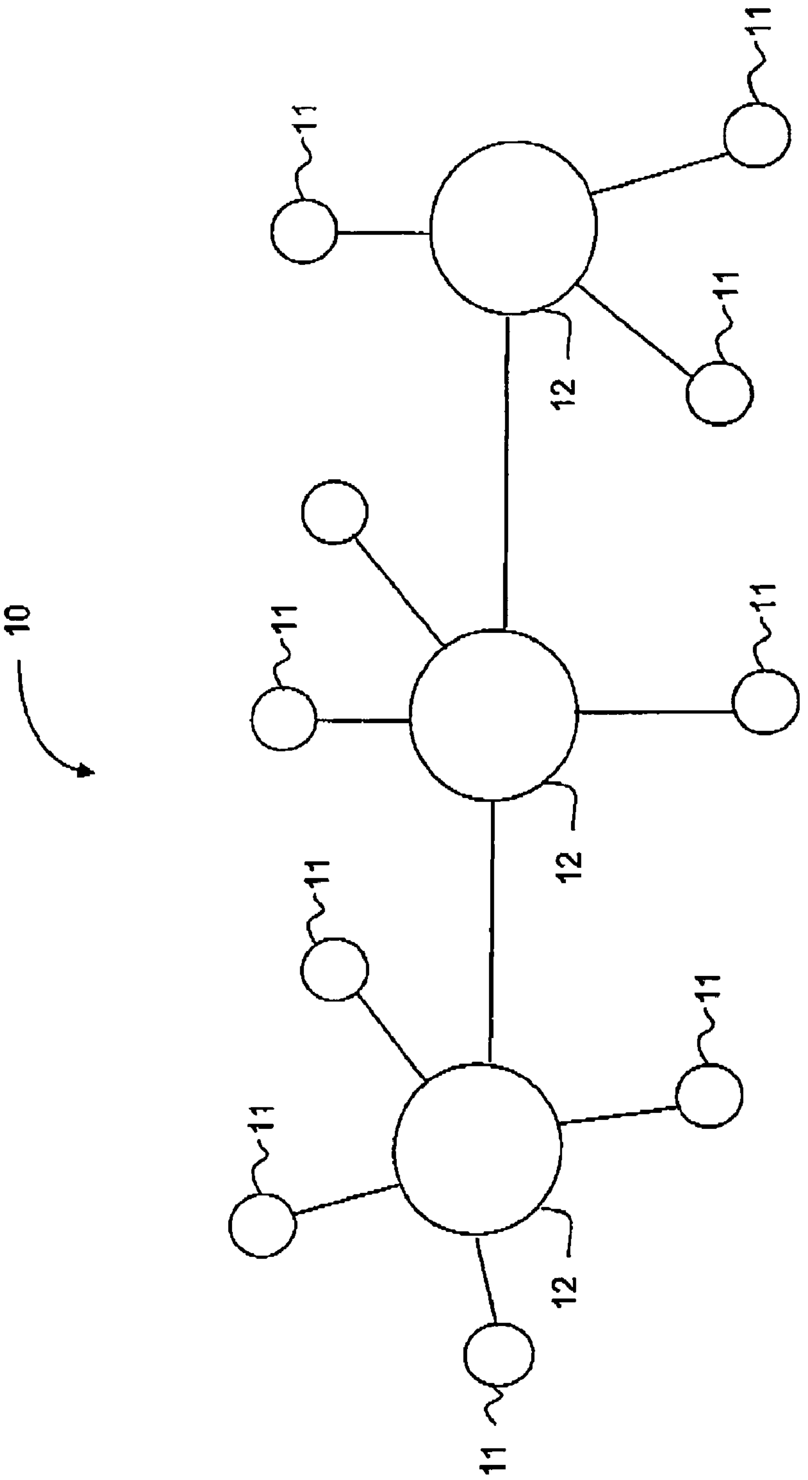

FIG. 2 is a schematic drawing of an exemplary delivery network in accordance with an embodiment of the present invention.

Figure 3:
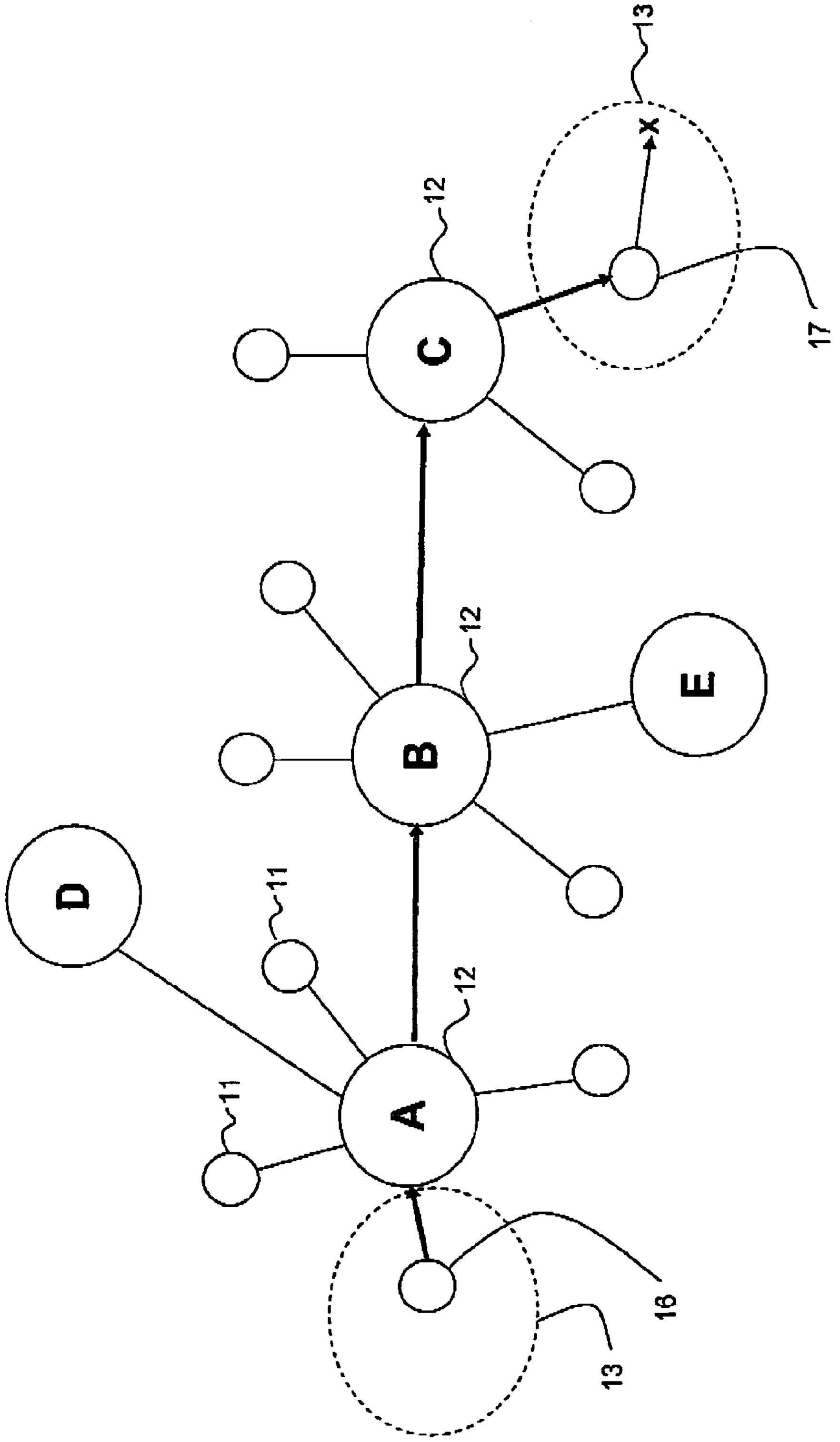

FIG. 3 is a schematic drawing illustrating the flow of a package through a delivery network in accordance with an embodiment of the present invention.

Figure 4:
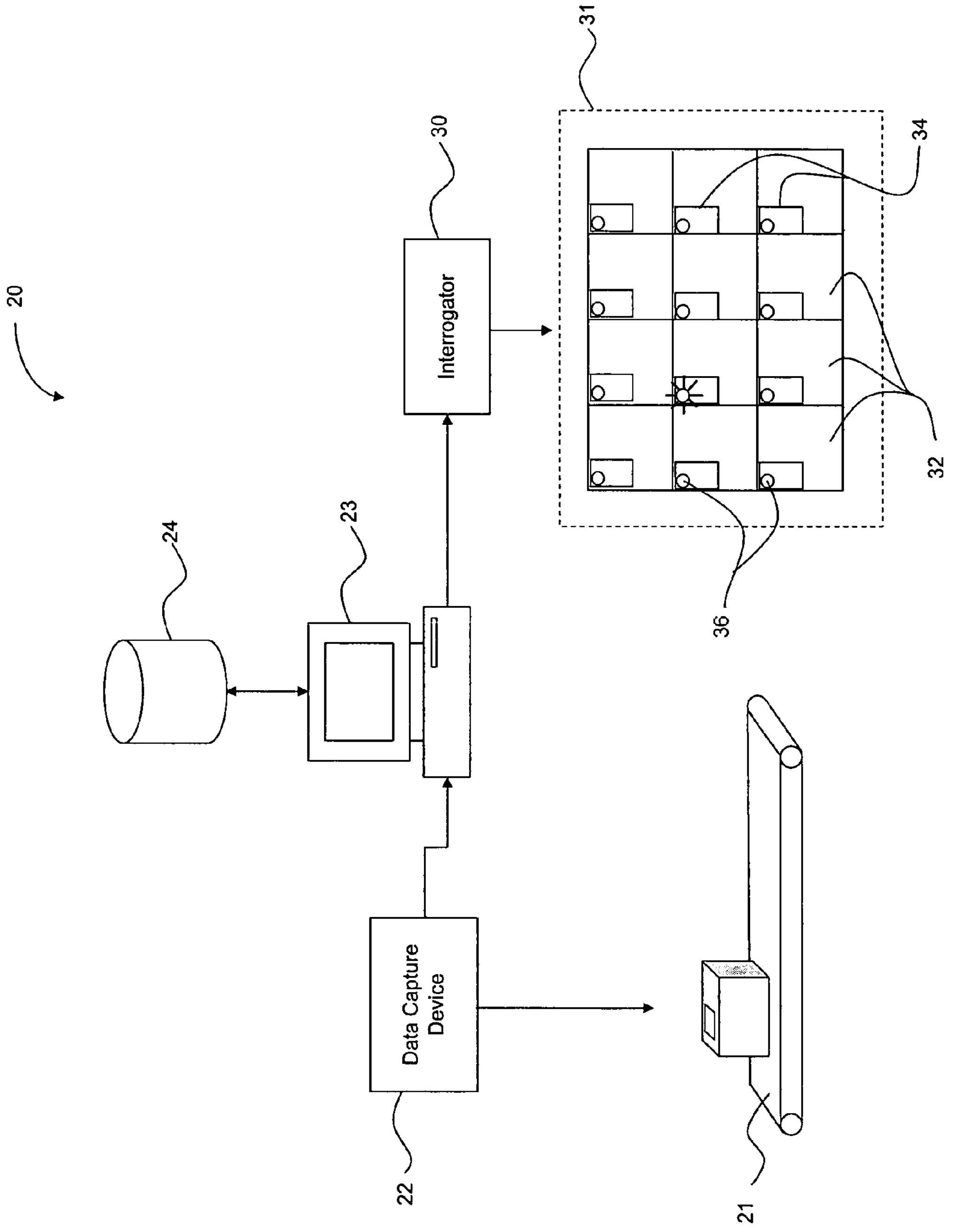

FIG. 4 is a schematic drawing of a sorting assist system in accordance with an embodiment of the present invention.

Figure 5:
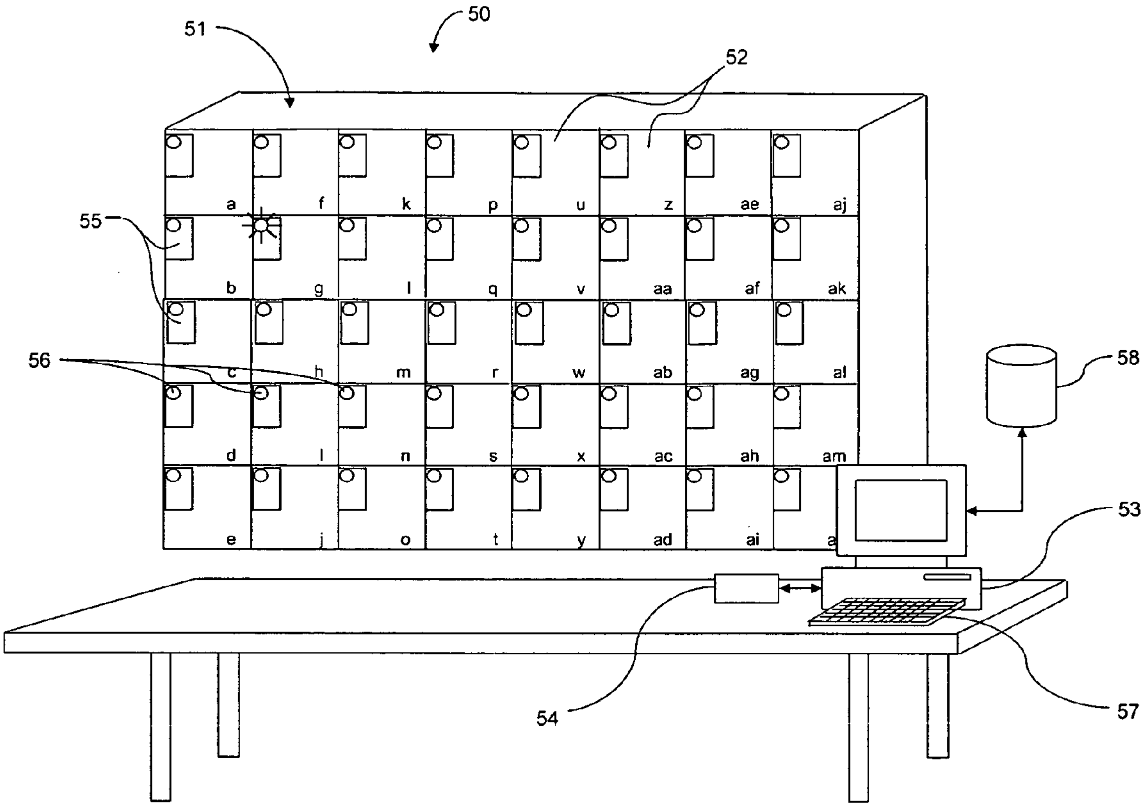
Figure 6:
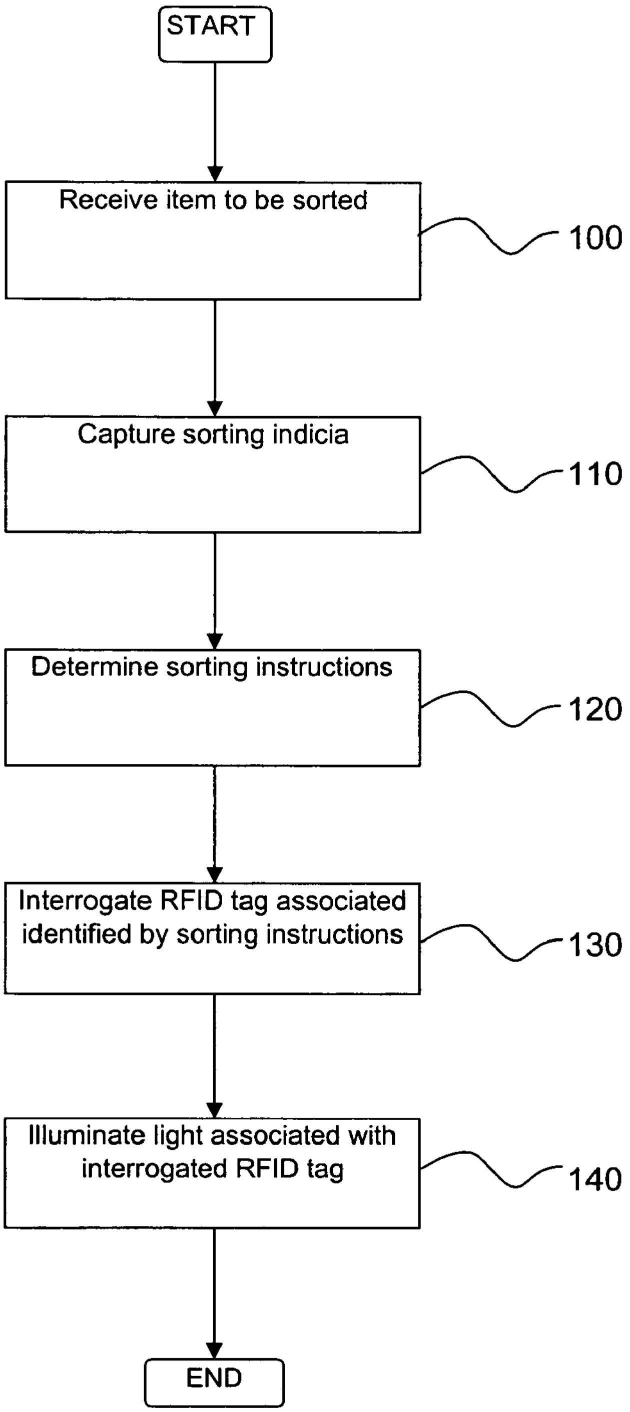

FIG. 5 is a schematic drawing of a locating assist system in accordance with an embodiment of the present invention FIG. 6 is a process flow diagram illustrating a method in accordance with an embodiment of the present invention.

Figure 7A:
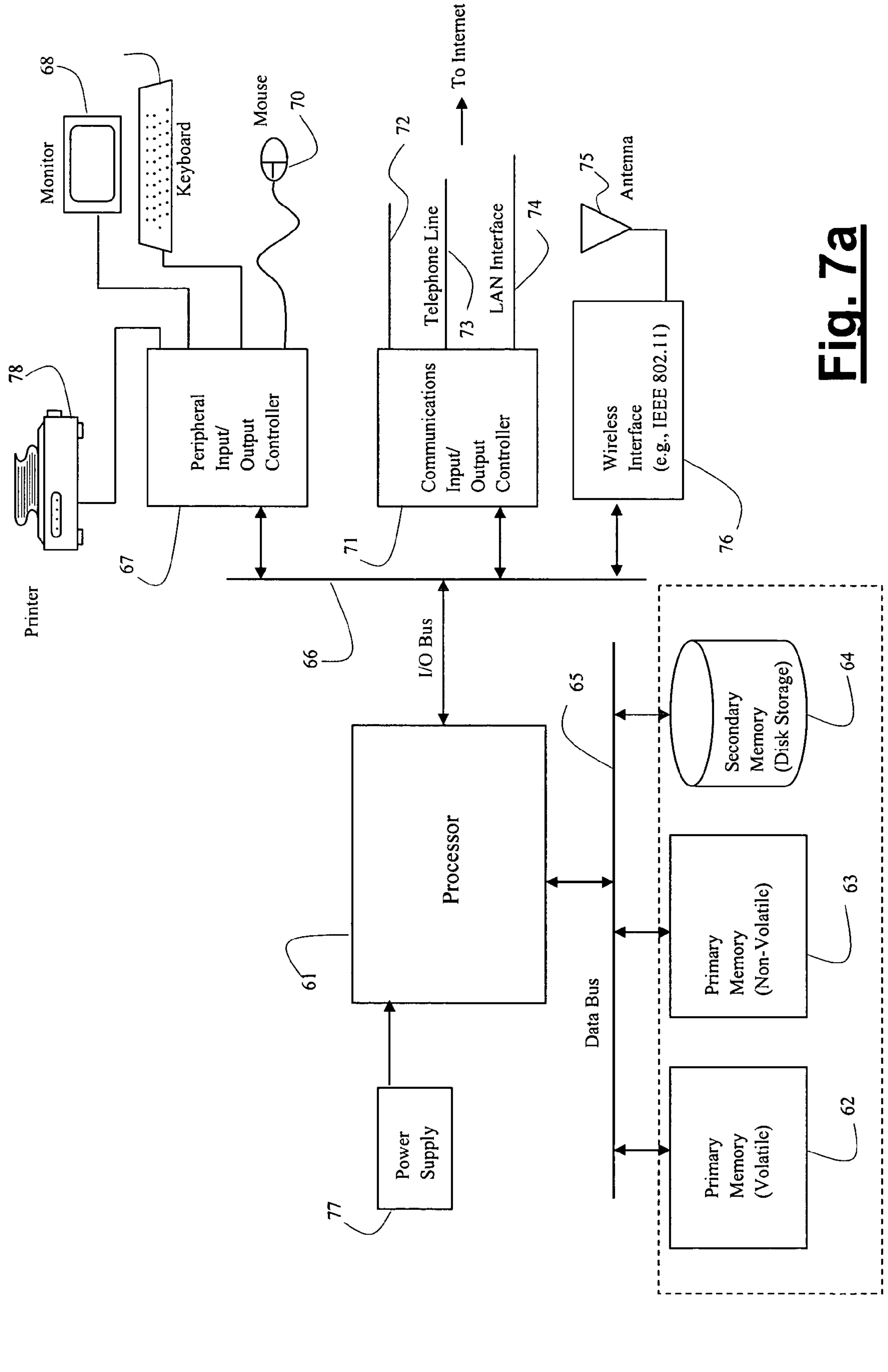
Figure 7B:
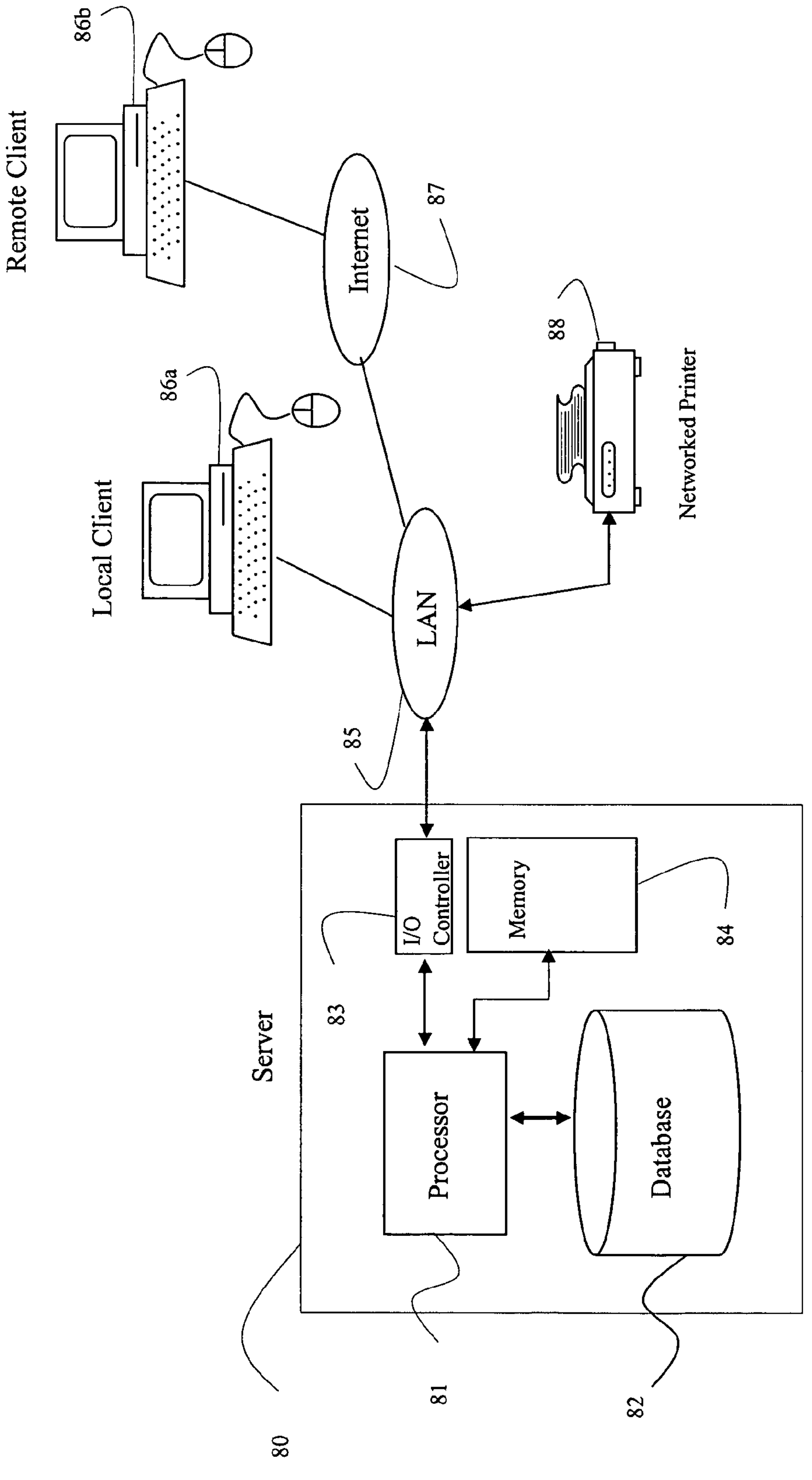

FIGS. 7*a* and 7*b* are schematic drawings of embodiments of a computer system in accordance with an embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The present invention provides novel systems and methods for sorting packages. In a preferred embodiment, radio frequency identification technology (RFID) is used to communicate sorting instructions to a sorting operator.

Radio Frequency Identification Technology

Radio frequency identification technology uses radio waves rather than optics to capture and transmit data. RFID is basically a form of labeling where electronic labels or tags are programmed with unique information and attached to objects to be identified or tracked. In RFID, electronic chips are used to store data that can be broadcast via radio waves to a reader, thereby eliminating the need for a direct line of sight and making it possible for tags to be placed virtually anywhere. Additional benefits of RFID are the greater data storage capacity of the RFID tag in comparison to the barcode and the decreased likelihood that the RFID tag will be destroyed or otherwise made unreadable.

A typical RFID system consists of a reader, a tag and a data processing system to process the data read from the tag. The tag also is called a transponder, an expression that is derived from TRANSmitter/resPONDER and, in some cases, the term tag is used for low-frequency (e.g. 125 kHz), whereas the term transponder is used for high-frequency (e.g. 13.56 MHz and 2.45 GHz) tags. But for purposes of this application the terms tag and transponder are used interchangeably. The complexity of the reader (sometimes referred to herein as an interrogator) can vary considerably, depending on the type of tag used and the function to be fulfilled. In general, a reader has radio circuitry to communicate with a tag, a microprocessor to check and decode the data and implement a protocol, a memory to store data and one or more antennas to receive the signal.

Unlike a barcode reader, which is limited to reading a single barcode at a time, a RFID reader may have more than one tag in its interrogation zone. The interrogation zone, as that term is used herein, refers to the area covered by the magnetic field generated by the reader's antenna. The process of reading a number of transponders within a system's interrogation zone is known as batch reading. Software applications known as anti-collision algorithms exist that permit a reader to avoid data collision from several tags that enter the interrogation zone at the same time. One of three different anti-collision techniques is generally implemented; these techniques are spatial, frequency and time domain procedures.

In the spatial domain technique, the reader restricts its interrogation zone in order to reduce the possibility that two different transponders fall into the area covered by the reader itself. With this technique, the number of readers needed to cover an area increases in proportion to the size of the covered area.

Frequency domain procedures are based on frequency domain multiplex techniques or spread spectrum technologies. In these systems, the reader broadcasts a status of frequencies allocated to the communication with the transponders, with frequencies flagged that are currently in use by a transponder. When a new transponder accesses the reader's coverage, it uses an unoccupied frequency to transmit its data.

Time domain anti-collision techniques are divided into two categories: interrogator and transponder driven procedures. In addition, interrogator driven time domain anti-collision procedures can be sub-divided into polling and binary search procedures. Polling techniques make use of the fact that a unique serial number is written to each transponder at the production stage. In the polling technique, the interrogator requests all possible transponder serial numbers until a transponder with a polled serial number responds. The polling procedure is typically slow and generally is limited to processes employing small numbers of transponders. The other interrogator driven procedure is the binary search. A binary search is faster than the polling technique, and is based on search algorithms that use binary trees of transponder identifiers. In the transponder driven anti-collision procedures, the transponder, rather than the interrogator, controls the data flow. In general, transponder driven procedures are based on the cyclic transmission of identifiers by transponders and are designed such that it is unlikely that any two transponders will send the same identifier at the same time.

RFID package tags may be active or passive depending on whether they have an on-board power source or not. In general, active tags use batteries to power the tag transmitter (radio) and receiver. This independent power source provides greater capabilities such as, for example, greater communication ranges, better noise immunity and higher data transmission rates than passive tags. But, these tags usually contain a greater number of components than do passive tags and therefore, are usually larger in size and are more expensive than passive tags. In addition, the life of an active tag is directly related to battery life.

In contrast, a passive tag reflects the RF signal transmitted to it from a reader and adds information by modulating the reflected signal. A passive tag does not use a battery to boost the energy of the reflected signal. But, a passive tag may use a battery to maintain memory in the tag or power the electronics that enable the tag to modulate the reflected signal. Passive tags have virtually unlimited life, but have shorter read ranges and require high-powered readers.

Package Delivery Network

While the present invention may be implemented in any operation requiring an operator to identify a location, for purposes of illustration, the invention will be described with reference to a package delivery network. The following paragraphs will describe an exemplary package delivery network.

With reference to FIG. 2, a delivery network 10 comprises a plurality of sorting facilities linked by transport and arranged in a hub and spoke configuration. Preferably, the sorting facilities are divided into two broad categories: service centers 11 and intermediate sorting hubs 12. In a preferred embodiment, service centers 11 have responsibility for the delivery and pickup of packages within a designated geographic area 13. Service centers 11 may also receive packages directly from consignors. If the destination address 14 of a package picked up or received from a consignor is outside the designated delivery area 13 for that service center 11, the package is sorted at the receiving service center 11 and consolidated for transport to an intermediate sorting hub 12.

An exemplary package flow in accordance with an embodiment of the present invention is illustrated in FIG. 3. In this embodiment, the package flows from an origin facility 16 to a destination facility 17 via a series of intermediate sorting hubs 12. As used herein, the origin facility 16 is the first facility to receive a package. The package may be received directly from a consignor, or the package may be received from a delivery vehicle that has picked up the package from a consignor's home or business. The origin facility 16 is preferably a service center 11; however, in an alternative embodiment, an intermediate sorting hub 12 or another carrier facility can serve as an origin facility 16 and may be the first facility in the delivery network 10 to receive a package.

As used herein, a destination facility 17 is the last carrier facility to handle the package before the package is picked up by the consignee or delivered to the consignee by a delivery vehicle. This facility too is preferably a service center 11. But again, an intermediate sorting hub 12 or another carrier facility can serve as a destination facility from which packages are delivered to consignees, or from which packages are held for consignee pickup.

A delivery plan for a package designates which facilities a package will pass through on its journey from an origin facility to a destination facility. At each facility, packages are sorted according to the next facility downstream of the current facility based on the package's associated delivery plan. In a preferred embodiment, the packages are consolidated further according to a sorting instruction, which specifies a facility two or more facilities downstream in the delivery plan. For example, for the package flow shown in FIG. 3, a package received at Intermediate Hub A may simply be consolidated with packages bound for Intermediate Hub B. Alternatively, this same package may be consolidated into a container with other packages bound for Intermediate Hub C even though Hub C is not directly connected to Hub A. Therefore, when the container with the consolidated packages reaches Intermediate Hub B, the operator only has to sort a single container to Intermediate Hub C rather than each individual package within the container. As a result, the overall sorting time is reduced because the packages are handled as a consolidated group rather than individually.

The present invention may be implemented to aid the sorting processes at each of the facilities within the above described delivery network. More specifically, the present invention provides a visual indication of a sorting instruction to an operator.

Sort Assist System

In a preferred embodiment of the present invention, as illustrated in FIG. 4, a sort assist system 20 utilizes RFID technology to communicate sorting instructions to a sorting operator. Generally described, this embodiment includes a conveyor 21, a data capture device 22, a sort assist tool 23, a sortation database 24, an interrogator 30, and a sorting area 31 having a plurality of sort locations 32 with associated RFID tags 34.

Packages received by a sortation facility are transported to a sorting area via conveyor 21. Preferably, conveyor 21 is a belt conveyor or roller conveyor; however, any package conveying device or method known in the art may be used in connection with this invention.

In a preferred embodiment, a data capture device 22 captures the destination zip code and service level from a label associated with a package. Alternatively, the data capture device 22 may capture a tracking number or other shipping label indicia from a package and use that to query a database of package data to determine the destination zip code and service level of the package. As will be apparent to one of ordinary skill in the art, any shipping indicia may be used in connection with the present invention.

The data capture device 22 may be a barcode reader, an RFID interrogator or any other type of automated or manual data capture device known in the art.

As described in greater detail below, in a preferred embodiment, a sort assist tool 23 queries a sorting instruction database 24 with a destination zip code and service level that are captured from the package, and this query results in a sort instruction for the package. But, one of ordinary skill will recognize that the sorting instruction does not have to be determined from the destination zip code and the service level. Thus, for example, a carrier may offer only one service level, in which case, a sort plan can be determined from the destination zip code alone, or alternatively from the destination address alone. As will be apparent, the sorting instruction can be based on any combination of shipping indicia and the present invention is not dependent on any one approach.

As used herein, sorting instructions identify a specific sort location within a sorting area. This sort location is associated with a destination within the delivery network. Typically, this destination is a sort facility downstream of the current location that the package will pass through in route to the destination address. The sorting instruction may identify the sort location using a name, or code associated with the downstream sort facility. In the prior art, sorting charts provided a list of sorting instructions indexed by destination zip code and service level. The sorting instructions typically included the name of the next sort facility downstream in the delivery process. In the present invention, the sorting instructions are stored in electronic format in a sorting instruction database.

Once the destination address and service level have been captured and a sorting instruction identified for a package, the sorting instruction is sent to the RFID interrogator 30. The interrogator 30 searches a sorting area 31 for the RFID tag identified by the instructions received.

The sorting area 31 includes a plurality of sortation locations 32 with associated RFID tags 34. These RFID tags may be passive or active tags. The associated tags preferably have an incorporated LED 36 that illuminates when the tag communicates with an interrogator 30. Individual RFID tags 34 may be located using a preprogrammed RFID tag number that is associated with a sort location 32 by the sort assist tool 23. Alternatively, as will be recognized by those skilled in the art, individual RFID tags 34 may be distinguished using user-defined identifiers such as for example, a code or name associated with a sorting location 32.

In operation, the interrogator 30 locates and communicates with the RFID tag 34 identified by the sorting instructions. Preferably, the tag is located using a polling technique or a binary search routine, but as will be apparent to one of ordinary skill in the art, any method may be used to identify the appropriate RFID in connection with the present invention.

As stated earlier, the RFID tags preferably have an incorporated LED 36 that illuminates when the tag responds to a communication from an interrogator. Consequently, when the interrogator communicates with the tag identified by the sort instructions, the LED 36 on the tag illuminates and provides a visual indication of the appropriate bin, chute or conveyor belt for the sorting operator. This visual indication allows the operator to identify at a glance the appropriate location for a package. The LED 36 may be programmed to illuminate only during communication or may remain illuminated for a specified duration after initial communication with the interrogator 30. Alternatively, the LED 36 may flash thereby providing a more noticeable indication of the sorting location for the sorting operator. As will be obvious to one of ordinary skill in the art, any indication of a sortation location may be provided in connection with the present invention.

A benefit of the methods described above is that the sorting efficiency is no longer tied to the knowledge base of the sorting operator. Instead, the operator simply sorts the package according to visual indications provided by the RFID tags. This enables the carrier to increase the number of sort locations for a given operator. Additionally, the visual indication reduces the chance of sorting mistakes. Moreover, the sorting instructions for a specific zip code or service level may be changed and therefore the sorting plan for the delivery network as a whole without a significant learning curve because the sorting operation is no longer tied to the knowledge-base of the operator.

In an alternative embodiment of the sort assist system 10, the label associated with the package includes sorting instructions for the current location. The sorting instructions may include for example an RFID tag number or the name of the next facility in the delivery plan. In this embodiment, the data capture device 22 simply captures and communicates the sorting instruction directly to the RFID interrogator without querying a database. The interrogator 32 communicates with the RFID tag 34 associated with the identified location and in response, the tag illuminates a light 36.

In a further embodiment, the system does not include a conveyor 21. Rather, the items to be sorted are transferred proximate the sorting operator in a bin or in bulk. The sorting operator retrieves an item, captures the sorting criteria from the item, and the system provides a visual indication of the sort location 32 by illuminating an LED 36 incorporated in an RFID tag 34.

Item Location System

The foregoing paragraphs describe the invention in the context of systems and methods to identify a target destination of an item. Another aspect of the invention is using the RFID tag equipped with a LED to choose from a plurality of locations to identify a source of a good. The following paragraphs describe this aspect of the invention in the context of a pick and pack assist system, but one of ordinary skill in the art will readily recognize that the present invention is equally advantageous in other settings.

A pick and pack environment is illustrated in FIG. 5. In this illustration, an operator receives a purchase order for one or more items and retrieves the items from a warehouse or storage area 51. A storage area, as used herein, will typically include multiple storage locations 52 (a-an) such as a cluster of bins or a series of racks, with each storage location 52 preferably associated with a different item or group of items.

An embodiment of the present invention is a pick and pack environment that includes a storage area 51 having a multiple storage locations 52, a location tool 53, and an interrogator 54. RFID tags 55 equipped with LEDs 56 are preferably associated with and disposed adjacent each storage location 52.

In a pick and pack operation, a purchase order that identifies one or more items to be included in an order is received at a pick and pack facility or area. The item or items listed in the purchase order are stored in storage area 51 and are preferably indexed by an item number or other unique item identifier. The storage location 52 for each item may be included on the purchase order, but as described below, an operator in the pick and pack station does not rely solely on the human-readable text of the purchase order to retrieve the identified item or items in the purchase order.

In one embodiment, the item number (or other unique indicia) is captured from the purchase order and entered into the location tool 53. The item number may be key entered by an operator or the information may be captured electronically using any data capture system that is known in the art, including, without limitation, bar codes, optical scan, and OCR. The location tool 53 then queries an item database 58 and retrieves a storage location 52 associated with the item and an RFID tag number that identifies the LED-equipped RFID tag associated with the identified storage location.

Depending on the type of information received at the location tool 53, the tool 53 may be configured to perform different types of queries. Thus, for example, if the purchase order includes information about the storage location 52 for one or more items in the order, the location tool 53 will use the storage location 52, rather than the item number, to query the item database 58 and retrieve the identifier for the LED-equipped RFID associated with that storage location 52.

In still another possible configuration, the location tool 53 receives a purchase order number and uses the purchase order number to query an order database that returns a list of all the items associated with that purchase order. The process may require only a single query that returns a list of every order item in the purchase order and the associated storage location 52 and RFID tag number associated with each order item. Alternatively, the location tool 53 may perform a series of queries to more than one database, such as, for example, a first query to obtain the list of order items associated with a purchase order and a second query to obtain the storage locations associated with each order item, and a third query to obtain the RFID tag associated with each storage location 52. One of ordinary skill in the art will recognize that any number of hardware and software architectures can be used with the present invention to associate an order item with a storage location and a storage location with an LED-equipped RFID tag.

Once the location tool 53 retrieves the RFID tag number or other indicia that identifies the LED-equipped RFID tag associated with the storage location 52 for an order item, the tool 53 passes the RFID identifier to an interrogator 54. In response, the interrogator 54 sends a signal to the LED-equipped RFID tag identified by that tag number and causes the tag to illuminate or turn on the associated LED.

The lit LED provides a visual indication to an operator that identifies which of the plurality of locations contains the order item to be added to the order. The operator may notify the location tool 53 that the item has been "picked" by pressing a key on a keyboard 56 in communication with the location tool 53. Alternatively, the storage locations may be equipped with conventional light curtains that are configured to send a signal to the location tool 53 when the curtain is broken by a user picking the item from the associated bin. As will be apparent to one of skill in the art, any method of sending an electronic signal to the location tool 53 notifying the tool that an item is picked may be used in connection with the present invention. In still another embodiment, the system does not identify when an item is picked and instead, the LED is lit for a predetermined period of time.

In one embodiment, the pick and pack processing proceeds on an item-by-item basis. Thus, in one embodiment, an operator serially scans each item in a purchase order and picks the item from the storage location identified by the lit LED. In the embodiment, wherein the entire purchase order is scanned at one time, the system may identify the location for every item in the purchase order at one time. Thus, if a purchase order was read that contained multiple order items, the system might cause the LEDs associated with several storage locations to light up at once, and the operator would retrieve the various order items for the purchase order from the various storage locations identified by the system. In one such embodiment, the light curtain described above could be used to count the number of items retrieved from each storage location and thus the operator would know to continue pulling items from the storage location until the LED turned off. One of ordinary skill will recognize that other control systems are known in the art for controlling and tracking inventory movement and can be used with the present invention.

One of ordinary skill in the art will readily recognize that the present invention may be implemented in any environment wherein the location of an item is sought. For example, this concept may be used to locate an item in a warehouse that has a plurality of aisles or shelves, or to locate a vehicle in a parking lot.

Method for Using RFID Tags to Communicate a Location

FIG. 5 shows a process flow diagram that illustrates a method in accordance with an embodiment of the present invention. The process begins at step 100 where a package is received at a sorting facility. The package is preferably conveyed to a sorting area via conveyor 21.

At step 110, the destination address and zip code are captured for the package by the data capture device 22. In one embodiment, a sorting operator retrieves the package from a conveyor 21 and captures the shipping indicia using a handheld barcode scanner. Alternatively, a barcode scanner may be mounted to the conveyor 21 upstream of the operator, and the shipping indicia captured automatically. The captured data is communicated to the sort assist tool 23.

At step 120, the sorting assist tool 23, using the captured destination zip code and service level, associates a sort instruction to the package. The sort instruction preferably includes an RFID identifier. The sort assist tool 23 communicates the associated RFID identifier to the interrogator 30. Of course, the sorting instruction may include the name of the next facility in the delivery plan and the sort assist tool 23 would associate an RFID identifier with this sorting instruction.

At step 130, the interrogator 30 polls the RFID tags 34 within a sorting area 35 until the RFID tag identified by the sort assist tool 23 responds. When the tag responds, the tag illuminates a light 36 to provide a visual indication of the appropriate sort location 32 for the sorting operator at step 140. This light allows the operator to identify the appropriate sort location at a glance.

Computer System for Implementing the Invention

Turning to FIG. 7*a*, one embodiment of a computer is illustrated that can be used to store and execute the sorting assist tool or location tool. In FIG. 7*a*, a processor 61, such as a microprocessor, is used to execute software instructions for carrying out the defined steps. The processor receives power from a power supply 77 that also provides power to the other components as necessary. The processor 61 communicates using a data bus 65 that is typically 16 or 32 bits wide (e.g., in parallel). The data bus 65 is used to convey data and program instructions, typically, between the processor and memory. In the present embodiment, memory can be considered primary memory 62 that is RAM or other forms which retain the contents only during operation, or it may be non-volatile 63, such as ROM, EPROM, EEPROM, FLASH, or other types of memory that retain the memory contents at all times. The memory could also be secondary memory 64, such as disk storage, that stores large amount of data. In some embodiments, the disk storage may communicate with the processor using an I/O bus 66 instead or a dedicated bus (not shown). The secondary memory may be a floppy disk, hard disk, compact disk, DVD, or any other type of mass storage type known to those skilled in the computer arts.

The processor 61 also communicates with various peripherals or external devices using an I/O bus 66. In the present embodiment, a peripheral I/O controller 67 is used to provide standard interfaces, such as RS-232, RS422, DIN, USB, or other interfaces as appropriate to interface various input/output devices. Typical input/output devices include local printers 78, a monitor 68, a keyboard 69, and a mouse 70 or other typical pointing devices (e.g., rollerball, trackpad, joystick, etc.).

The processor 61 typically also communicates using a communications I/O controller 71 with external communication networks, and may use a variety of interfaces such as data communication oriented protocols 72 such as X.25, ISDN, DSL, cable modems, etc. The communications controller 71 may also incorporate a modem (not shown) for interfacing and communicating with a standard telephone line 73. Finally, the communications I/O controller may incorporate an Ethernet interface 74 for communicating over a LAN. Any of these interfaces may be used to access the Internet, intranets, LANs, or other data communication facilities. Finally, the processor 61 may communicate with a wireless interface 76 that is operatively connected to an antenna 75 for communicating wirelessly with another devices, using for example, one of the IEEE 802.11 protocols, 802.15.4 protocol, or a standard 3G wireless telecommunications protocols, such as CDMA2000 1× EV-DO, GPRS, W-CDMA, or other protocol.

An alternative embodiment of a processing system than may be used is shown in FIG. 7*b*. In this embodiment, a distributed communication and processing architecture is shown involving a server 80 communicating with either a local client computer 86*a* or a remote client computer 86*b*. The server 80 typically comprises a processor 81 that communicates with a database 82, which can be viewed as a form of secondary memory, as well as primary memory 84. The processor also communicates with external devices using an I/O controller 83 that typically interfaces with a LAN 85. The LAN may provide local connectivity to a networked printer 88 and the local client computer 86*a*. These may be located in the same facility as the server, though not necessarily in the same room. Communication with remote devices typically is accomplished by routing data from the LAN 85 over a communications facility to the Internet 87. A remote client computer 86*b* may execute a web browser, so that the remote client 86*b* may interact with the server as required by transmitted data through the Internet 87, over the LAN 85, and to the server 80.

Those skilled in the art of data networking will realize that many other alternatives and architectures are possible and can be used to practice the principles of the present invention. The embodiments illustrated in FIGS. 7*a* and 7*b* can be modified in different ways and be within the scope of the present invention as claimed.

CONCLUSION

It should be noted that any process descriptions or blocks in flow charts represent modules, segments, or portions of code that include one or more executable instructions for implementing specific logical functions or steps in the process. Alternate implementations are included within the scope of the present invention in which functions may be executed out of order from that shown or discussed, including substantially concurrently or in reverse order, depending on the functionality involved, as would be understood by those reasonably skilled in the art of the present invention.

Although the foregoing invention description uses a package delivery and a pick and pack environment as examples, it will be readily apparent that the present invention may be applied to any manual operation in which determining a location is necessary. Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for sorting an item comprising:

a plurality of RFLD tags equipped with lights that illuminate in response to a communication;

a plurality of sorting locations, wherein each of said sorting locations is associated with one of said plurality of RFID tags;

a data capture device configured to capture sorting indicia from said item;

a sort assist tool that receives said sorting indicia from said data capture device and determines a sorting instruction identifying a specific sorting location chosen from said plurality of sorting locations;

an interrogator that receives said sorting instruction and communicates with an RFID tag associated with said specific sorting location such that said light on said RFID tag associated with said specific sorting location illuminates; and an item detection device that senses when said item passes the threshold of said specific sorting location and signals said interrogator to stop communicating with said RFID tag associated with said specific sorting location.

2. The system for sorting an item in claim 1, wherein said RFID tags have unique identifiers and said sort instruction identifies an RFID unique identifier associated with said RFID tag associated with said specific sorting location.

3. The system for sorting an item in claim 2, wherein said unique identifier includes the name of said specific sorting location.

4. The system for sorting an item in claim 1 further comprising a conveyor.

5. The system for sorting an item in claim 1, wherein said data capture device is a barcode scanner.

6. The system for sorting an item in claim 1, wherein said data capture device is a RFID reader.

7. The system for sorting an item in claim 1, wherein said data capture device is a CCD camera and associated recognition software.

8. The system for sorting an item in claim 1, wherein said light flashes when said reader communicates with said tag.

9. The system for sorting an item in claim 1, wherein said RFID tag is configured to allow adjustment of LED illumination duration.

10. The system for sorting an item in claim 1, wherein said item is a package.

11. The system for sorting an item of claim 10, wherein said sorting indicia includes a destination zip code.

12. The system for sorting an item in claim 10, wherein said sorting indicia includes a service level.

13. The system for sorting an item in claim 10, wherein said sort assist tool associates a sorting instruction to said package by querying a sort instruction database with said sorting indicia.

14. The system for sorting an item in claim 13, wherein said sorting instruction database includes a list of sorting locations and associated RFID identifiers indexed by shipping indicia.

15. A method for sorting a package comprising the steps of:

providing a plurality of RFID tags having associated lights; associating each of said plurality of RFID tags with one of a plurality of sorting locations;

capturing shipping indicia from said package;

identifying a sorting location from said plurality of sorting locations based at least in part on said captured indicia;

communicating with an RFID tag associated with said sorting location such that a light associated with said RFID tag is illuminated; and sensing when said package crosses the threshold of said identified sorting location and extinguishing said light.

16. The method for sorting a package of claim 15, wherein said step of identifying a sorting location includes identifying a unique RFID identifier associated with said sorting location.

17. The method for sorting a package of claim 15, wherein said step of identifying a sorting location includes the step of querying a sorting instruction database to obtain said sorting location.

18. The method for sorting a package of claim 17, wherein said sorting instruction database is indexed according to said shipping indicia.

* * * * *

UNITED STATES PATENT AND TRADEMARK OFFICE

CERTIFICATE OF CORRECTION

PATENT NO. : 7,221,276 B2

APPLICATION NO. : 10/910167

DATED : May 22, 2007

INVENTOR(S) : Olsen, III et al.

It is certified that error appears in the above-identified patent and that said Letters Patent is hereby corrected as shown below:

Column 11,

Line 61, “RFLD” should read --RFID--.

Signed and Sealed this

Twenty-first Day of August, 2007

JON W. DUDAS

*Director of the United States Patent and Trademark Office*